United States Patent Office 3,778,474
Patented Dec. 11, 1973

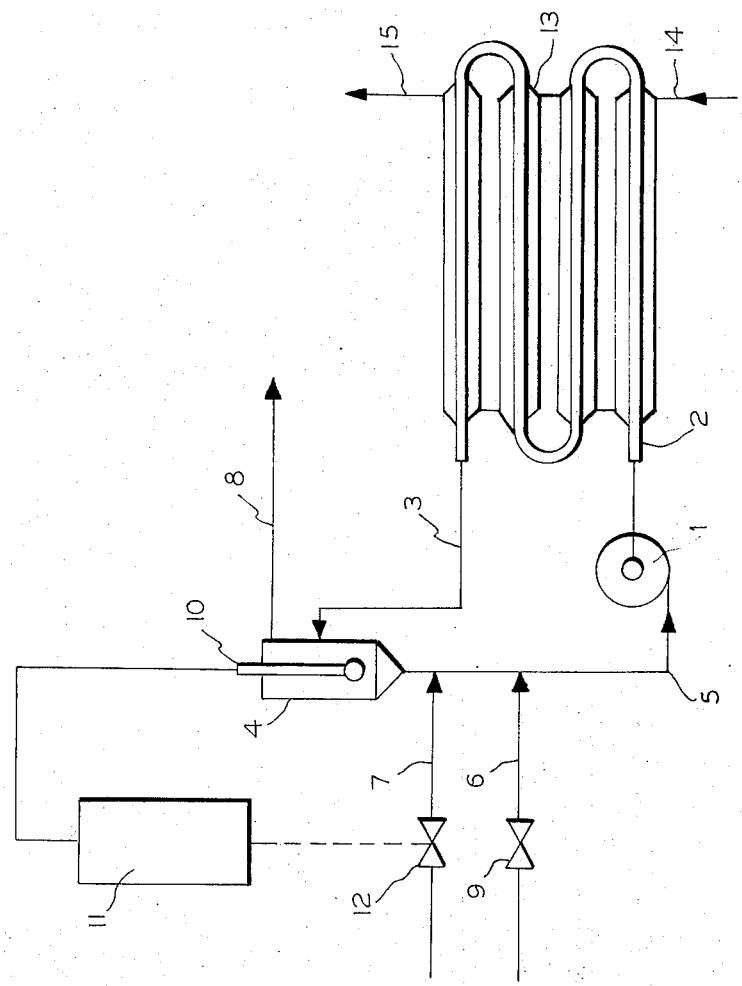

3,778,474
PRODUCTION OF ACETOACETYL AMIDES
August Stocker, Visp, Switzerland, assignor to Lonza Ltd., Gampel/Valais, Basel, Switzerland
Continuation-in-part of application Ser. No. 682,653, Nov. 13, 1967, which is a continuation-in-part of application Ser. No. 366,592, May 11, 1964, which in turn is a continuation-in-part of application Ser. No. 112,215, May 24, 1961, all now abandoned. This application Oct. 6, 1970, Ser. No. 78,358
Int. Cl. C07c 103/42
U.S. Cl. 260—561 K
9 Claims

ABSTRACT OF THE DISCLOSURE

Lower acetoacetyl alkylamides, which have a melting point not exceeding 80° C., may be prepared by reacting diketone with a monoalkylamine having 6 to 15 carbon atoms in a straight chain or a dialkylamine having 2 to 7 carbon atoms in each alkyl group in the presence of a reaction medium consisting of the preformed lower acetoacetyl alkylamide reaction product, at a temperature not exceeding 80° C. A continuous process is shown where there is automatically controlled addition of the alkylamine.

This invention relates to an improved method for the production of acetoacetyl alkylamides, and this application is a continuation-in-part application of application Ser. No. 682,653, filed Nov. 13, 1967, now abandoned which, in turn, is a continuation in-part application Ser. No. 366,592, filed May 11, 1964, now abandoned which, in turn, is a continuation-in-part of Ser. No. 112,215, filed May 24, 1969, now abandoned.

PRIOR ART

Acetoacetyl amides have been prepared by reacting primary or secondary amines (especially mono- and dialkylamines) with equivalent amounts of diketene in the presence of inert organic solvents, such as, benzene, toluene, chlorobenzene or ethyl acetate, and also in water as the reaction medium. Crystallized acetoacetyl amides obtained in that manner are freed from the solvent by separation and subsequent treatment in suitable driers at normal or reduced pressure. Liquid amides, however, can be separated only by distillation. These known methods have considerable drawbacks because, in the synthesis of solid amides of relatively low melting point and of liquid amides, the solvents can be removed only with difficulty and with reduced yields of the amide.

It has also been proposed to carry out the reaction in the absence of inert solvents or diluents. In such a procedure, however, undesired by-products are formed which cannot be removed without affecting the yield of the desired end product. Especially the lower acetoacetyl alkylamides cannot be prepared in this manner because of the high reactivity of the reactants and the formed reaction product.

Attempts to use acetoacetyl amides itself as a reaction medium failed because, due to the high reactivity of diketene, ammonia, and the acetoacetyl amide, violent side-reactions took place. Similar negative results were observed when acetoacetyl amides obtained from some lower alkylamines were used as reaction media, and the prior art has concluded that acetoacetyl amides generally could not be employed for this purpose becuase of the inherent side reactions with the reactants.

BROAD DESCRIPTION OF THIS INVENTION

In view of the above prior art it was extremely surprising to discover that nonetheless diketene can be reacted, practically without any side reactions, with alkylamines in the respective preformed acetoacetyl alkylamide as the sole solvent when the alkylamine is selected from the group consisting of monoalkylamines having 6 to 15 carbon atoms in a straight chain or from the group consisting of dialkylamines with each alkyl group having from 2 to 7 carbon atoms, and when the amount of the acetoacetyl alkylamide used as solvent is at all times at least two times the amount of the reactants. A further condition for the successful operation of such process is that the respective acetoacetyl alkylamide must have a melting point not exceeding 80° C. because at higher temperatures the recited side reactions cannot be avoided.

In a preferred embodiment of the invention, the reaction is carried out at temperatures of 5 to 20° C. above the melting point of the acetoacetyl alkylamide to be formed.

At room temperature, the acetoacetyl alkylamides of the invention are either liquids, such as an amide obtained from diethylamine, or solids, such as, acetoacetyl n-hexylamide.

The optimum reaction temperature is controlled by adjusting the feed rate of the reactants and by cooling the reaction medium corresponding to the heat development.

The purity of the products obtained according to the invention depends, of course, on the purity of the starting materials; using a 98.5% pure diketene, the purity of the end product is about 98%. Such high purity, as well as the almost quantitative yields are surprising. In view of the reactivity of the reactants and the reaction product, it would have been expected that various side reactions woud take place, such as, polymerization of diketene leading, for example, to dehydracetic acid, and condensations products, such as, lutidonic acid or homologues thereof. Accordingly, it would have been further expected that an inert diluent should be employed in as large as possible amounts. It was, therefore, surprising that said preformed reaction product in the form of the reaction medium could function as an inert diluent.

In a continuous process, the reaction is preferably started with a reaction medium corresponding to 2 to 10 times the amount of the reaction product formed per hour.

This invention also includes a process for the continuous production of lower acetoacetyl alkylamides. The process involves passing a fluid, in a continuous cycle, through a reaction tube (which can be cooled), through a control means and then back to the reaction tube to begin the cycle again. The fluid contains diketene, alkylamine and acetoacetyl alkylamide. The diketene reacts with the alkylamine in the reaction tube. The resultant acetoacetyl derivate melts at a temperature not exceeding 80° C. The alkylamine is selected from the group consisting of monoalkylamines having 6 to 15 carbon atoms in a straight chain and dialkylamines having 2 to 7 carbon atoms in each alkyl group. The preferred alkylamine is diethylamine. The reaction is carried out in the preformed reaction product as the sole reaction medium at temperatures above the melting point of the medium but not exceeding 80° C. The reaction temperature is about 5° to about 20° C. above the melting point of the acetoacetylalkylamide being formed. The sole reaction medium is always present in an amount at least two times the amount of said reactants. The diketene is introduced into the fluid after the fluid passes through the control means and before the fluid passes into the reaction means. The diketene has a purity of at least 98 percent. The alkylamine is introduced into the fluid after the fluid passes through the control means and before the fluid passes into the reaction means. The control means measures the amount of the alkylamine in the fluid coming out of the reaction tube and then regulates the amount of the alkylamine introduced into the fluids. The acetoacetyl alkylamide that is formed in the reaction tube, and elsewhere in the system is then removed. The acetoacetyl alkylamides are preferably liquid or solid at room temperature.

DETAILED DESCRIPTION OF THIS INVENTION

The figure in this invention is a schematic diagram of a continuous process for the production of acetoacetyl alkyl-amide where there is an automatically controlled addition of the amine.

In the figure, preformed acetoacetyl alkylamide is circulated by pump 1 through reaction tube (coil) 2, which typically has a length of 40 meters and a diameter of 4 cm., through conduit 3 to overflow vessel 4 and through pipe 5 to the pump 1. The diketene is fed into the system, at pipe 5, through pipe 6; and the alkylamine is introduced into the system, at pipe 5, through pipe 7. The formed acetoacetyl diethylamide is withdrawn through pipe 8. The feed rate of diketene is regulated by valve 9. A combined glass- and kalomelelectrode 10, for measuring the electrochemical potential is located in overflow vessel 4. Electrode 10 acts upon regulator 11 which regulates pipe 12, i.e., the food rate of the alkylamine passing through pipe 12 is regulated corresponding to the potential in overflow vessel 4. Reaction tube 2 is surrounded by cooler 13; 14 and 15 are pipes for the cooling medium. In this embodiment, the preferred alkylamine is diethylamine.

Diketene has the formula:

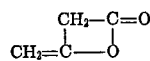

Ketene spontaneously polymerizes to diketene and the latter is available comercially. Diketene boils at 127° C. and melts at −6.5° C.

Useful monoalkylamines (primary amines) include: n-heptylamine; n-hexylamine; octylamine; nonylamine; decylamine; hendecylamine; dodecylamine; tridecylamine; tetradecylamine; and pentadecylamine.

Useful dialkyl amines (secondary amines) include: diethylamine; dipropylamine; dibutylamine; dihexylamine; diamylamine; deheptylamine; propyl-isopropyl-amine; diisopropylamine; N-ethyl-sec-butylamine; N-ethyl-butylamine; N-ethyl-tert-butylamine; ethyl-isopropylamine; hexyl-amylamine; ethyl-isohexylamine and ethyl-isoheptylamine and ethyl-isoheptylamine.

The preferred alkylamine is diethylamine.

Unless otherwise stated or indicated, in the following examples, all percentages and proportions are expressed on a weight basis. The following examples further illustrate, but do not limit, this invention.

EXAMPLE 1

1000 liters of preformed acetoacetyl diethylamide were placed in a reactor of stainless steel, which had a capacity of 2000 liters and was equipped with a stirrer and a cooling device (brine of −20° C.). Separately and continuously, 100 percent diethylamine and 98.5 percent diketene were added in a weight ratio of 1:1.17. It was constantly cooled, and the inside temperature was maintained at 20° C. by controlling the feed rates. There was formed about 120 kg./hour of acetoacetyl diethylamide, which were drawn off, by means of an overflow, into an afterreactor, where the reaction was completed by small additions of amine or diketene. The product was obtained as an oily liquid of 98 percent purity. $b_{14}$=119.5°–120.5° C.

EXAMPLE 2

Example 1 was repeated, except that the diethylamine was replaced with an equal molar amount of dipropylamine, and that the acetoacetyl diethylamide used as the reaction medium (solvent) was replaced with acetoacetyl dipropylamide. The product was extremely pure.

EXAMPLE 3

Example 1 was repeated, except that the diethylamine was replaced with an equal molar amount of diheptylamine, and that the acetoacetyl heptyl diethylamide used as the reaction medium (solvent) was replaced with acetoacetyl diheptylamide. The product was extremely pure.

EXAMPLE 4

Example 1 was repeated, except that the diethylamine was replaced with an equal molar amount of N-ethyltert-butylamine and that the acetoacetyl diethylamide used as the reaction medium (solvent) was replaced with acetoacetyl N-ethyl-tert-butylamide. The product was extremely pure.

EXAMPLE 5

Example 1 was repeated, except that the diethylamine was replaced with an equal molar amount of ethyl-isoheptylamine, and that the acetoacetyl diethylamide used as the reaction medium (solvent) was replaced with acetoacetyl ethyl-isoheptylamide. The product was extremely pure.

EXAMPLE 6

Example 1 was repeated, except that the diethylamine was replaced with an equal molar amount of pentadecylamine, and that the acetoacetyl diethylamide used as the reaction medium (solvent) was replaced with acetoacetyl pentadecylamide. The product was extremely pure.

EXAMPLE 7

Example 1 was repeated, except that the diethylamine was replaced with an equal molar amount of nonylamine, and that the acetoacetyl diethylamide used was the reaction medium (solvent) was replaced with acetoacetyl nonylamide. The product was extremely pure.

EXAMPLE 8

Example 1 was repeated, except that the diethylamine was replaced with an equal molar amount of docecylamine, and that the acetoacetyl diethylamide used as the reaction medium (solvent) was replaced with acetoacetyl docecylamide. The product was extremely pure.

EXAMPLE 9

100 gm. of acetoacetyl n-heptlyamide were heated at 60° C. in a 3-neck flask equipped with stirrer, thermometer, and dropping funnels. In the course of about 1 hour, 38.4 gm. of 100 percent n-heptylamine and 28.5 gm. of 98.5 percent diketene were added dropwise with vigorous stirring and cooling. After the addition was terminated, the corresponding amount of acetoacetyl n-heptylamide (about 65 gm.) was drawn off with a section tube and solidified by cooling. $m$=54–57° C. The process can be continued with further dropwise addition of diketene and n-heptylamine.

EXAMPLE 10

Example 9 was repeated, except that the n-heptylamine was replaced with an equal molar amount of diisopropylamine, and that the acetoacetyl n-heptylamide used as the reaction medium (solvent) was replaced with acetoacetyl diisopropylamide. The product was extremely pure.

EXAMPLE 11

A sump of 300 cc. of acetoacetyl n-hexylamide was heated at 60° C. in a 500 cc. three-neck flask provided with stirrer, thermometer, and dropping funnels. With vigorous stirring and cooling 100 percent of n-hexylamine and 98.5 percent diketene, in a weight proportion of 1:0.845, were separately introduced at 60° C. The warm acetoacetyl n-hexylamide was drawn off as it was formed, and solidified. $m$=56–58° C.

In this manner, about 200 gm. of acetoacetyl n-hexylamide may be prepared per hour.

EXAMPLE 12

Example 11 was repeated, except that the n-hexylamine was replaced with an equal molar amount of hendecylamine, and that the acetoacetyl n-hexylamide used as the reaction medium (solvent) was replaced with acetoacetyl hendecylamide. The product was extremely pure.

EXAMPLE 13

Example 11 was repeated, except that the n-hexylamine was replaced with an equal molar amount of ethyl-isohexylamine, and that the acetoacetyl n-hexylamide used as the reaction medium (solvent) was replaced with acetoacetyl ethyl-isohexylamide. The product was extremely pure.

EXAMPLE 14

Example 11 was repeated, except that the n-hexylamine was replaced with an equal molar amount of tetradecylamine, and that the acetoacetyl n-hexylamide used as the reaction medium (solvent) was replaced with acetoacetyl tetradecylamide. The product was extremely pure.

EXAMPLE 15

500 gm. of preformed acetoacetyl 2-ethylhexylamide were placed in a three-neck flask equipped with stirrer, thermometer, and dropping funnels. 129 gm. of 100 percent 2-ethylhexylamine and 86 gm. of 98 percent diketene were added dropwise, while stirring and cooling so that the temperature did not exceed 20° C. When the addition was completed, 215 gm. of acetoacetyl 2-ethylhexylamide was drawn off, which boil under a pressure of 0.01 mm. of mercury at 100–101° C.

EXAMPLE 16

Over a period of 2½ hours, 157 gm. of 100 percent n-diamylamine and 86 gm. of 98 percent diketene were added dropwise to 400 gm. of acetoacetyl n-diamylamide in a three-neck flask equipped with stirrer, thermometer and dropping funnels. The temperature was not allowed to exceed 20° C. Acetoacetyl n-diamylamide ($b_{15}$=111–112° C.) was obtained in substantially quantitative yield.

EXAMPLE 17

Example 16 was repeated, except that the n-diamylamine was replaced with an equal molar amount of hexylamylamine, and that the acetoacetyl n-diamylamide used as the reaction medium (solvent) was replaced with acetoacetyl hexyl-amylamide. The product was extremely pure.

EXAMPLE 18

Example 16 was repeated, except that the n-diamylamine was replaced with an equal molar amount of N-ethyl-butylamine, and that the acetoacetyl n-diamylamide used as the reaction medium (solvent) was replaced with acetoacetyl N-ethyl-butylamide. The product was extremely pure.

EXAMPLE 19

Example 16 was repeated, except that the n-diamylamine was replaced with an equal molar amount of decylamine and that the acetoacetyl n-diamylamide used as the reaction medium (solvent) was replaced with acetoacetyl decylamine. The product was extremely pure.

EXAMPLE 20

The apparatus shown in the figure was used. The alkylamine used was diethylamine. The acetoacetyl diethylamide cycle was 300 kg. per hour. 107 kg. per hour of diketene were charged and 200 kg. per hour of formed acetoacetyl diethylamide were withdrawn. Diethylamine is added in excess at the start of the reaction, which is reduced until the concentration of amine in the overflow vessel is 0.08 percent by weight (measured by the electrode). When this value was reached the automatic regulation means is activated. The temperature was maintained at 28° C. The residence time was 15 minutes. The yield of acetoacetyl diethylamide was 99.2 percent and the purity of the acetoactyl diethylamide was 97.3 percent.

EXAMPLE 21

Example 20 was repeated, except that the diethylamine was replaced with an equal molar feed rate of n-heptylamine, and that the acetoacetyl diethylamide used as the reaction medium (solvent) was replaced with acetoacetyl n-heptylamide. The product was extremely pure.

EXAMPLE 22

Example 20 was repeated, except that the diethylamine was replaced with an equal molar feed rate of pentadecylamine, and that the acetoacetyl diethylamide used as the reaction medium (solvent) was replaced with acetoacetyl pentadecylamide. The product was extremely pure.

EXAMPLE 23

Example 20 was repeated, except that the diethylamine was replaced with an equal molar feed rate of diheptylamine, and that the acetoacetyl diethylamide was replaced with acetoacetyl dihepthylamide. The product was extremely pure.

EXAMPLE 24

Example 20 was repeated, except that the diethylamine was replaced with an equal molar feed rate of ethyl-isohexylamine, and that the acetoacetyl diethylamide was replaced with acetoacetyl ethyl-isohexylamide. The product was extremely pure.

EXAMPLE 25

400 gm. of acetoacetyl dibutylamide were heated at 30° C. in a 3-neck flask equipped with a stirrer, thermometer and dropping funnels. In the course of about 1 hour, 86 gm. of 98 percent diketene and 129 gm. of dibutylamine were added and 227.5 gm. of acetoacetyl n-dibutylamide are drawn off. The yield was 99.5 percent.

What is claimed is:

1. A process for the production of lower acetoacetyl alkylamides which comprises reacting diketene with an alkylamine, the acetoacetyl derivative of which melts at a temperature not exceeding 80° C., wherein said alkylamine is selected from the group consisting of monoalkylamines having 6 to 15 carbon atoms in a straight chain and dialkylamines having 2 to 7 carbon atoms in each alkyl group, wherein said reaction is carried out in the preformed reaction product as the sole reaction medium at temperatures above the melting point of said medium but not exceeding 80° C. and wherein said sole reaction medium is always present in an amount of at least two times the amount of said reactants.

2. A process as described in claim 1 wherein the reaction temperature is about 5° to about 20° C. above the melting point of the acetoacetyl alkylamide being formed.

3. A process as described in claim 1 wherein said diketene has a purity of at least 98 percent, and wherein said acetoacetyl alkylamides are liquid or solid at room temperature.

4. A process as described in claim 1 wherein the alkylamine is diethylamine.

5. A process as described in claim 1 wherein the process is a continuous process and wherein the amount of the preformed reaction medium is about 2.0 to 10 times the amount of the hourly obtained reaction product when the continuous process is started.

6. A process for the continuous production of lower acetoacetyl alkylamides which comprises passing a fluid, in a continuous cycle, through a reaction tube, which can be cooled, through a control means and then back to the reaction tube to begin the cycle again, said fluid comprising diketene, alkylamine and acetoacetyl alkylamide, said diketene reacting with said alkylamine primarily in said reaction tube, the acetoacetyl derivate of which melts at a temperature not exceeding 80° C., wherein said alkylamine is selected from the group consisting of monoalkylamines having 6 to 15 carbon atoms in a straight chain and dialkylamines having 2 to 7 carbon atoms in each alkyl group, wherein said reaction is carried out in the preformed reaction product as the sole reaction medium at temperatures above the melting point of said medium but not exceeding 80° C., and wherein said sole reaction medium is always present in an amount at least two times of said reactants; introducing diketene into said fluid after said fluid passes through the control means and before said fluid passes into said reaction means; introducing alkylamine into said fluid after said fluid passes through the control means and before said fluid passes into said reaction means, said control means measuring the amount of the alkylamine in said fluid coming out of said reaction tube and then regulating the amount of the alkylamine introduced into said fluid; removing the acetoacetyl alkylamide that is formed in the reaction tube, and elsewhere in the system.

7. A process as described in claim 6 wherein said diketene has a purity of at least 98 percent, and wherein said acetoacetyl alkylamides are liquid or solid at room temperature.

8. A process as described in claim 6 wherein the alkylamine is diethylamine.

9. A process as described in claim 6 wherein the reaction temperature is about 5° to about 20° C. above the melting point of the acetoacetyl alkylamide being formed.

References Cited
UNITED STATES PATENTS

| | | | |
|---|---|---|---|
| 1,984,415 | 12/1934 | Macallum | 260—465.6 |
| 2,152,132 | 3/1939 | Boese | 260—561 |
| 2,174,239 | 9/1939 | Gleason | 260—561 |
| 2,462,358 | 2/1949 | Caldwell | 260—561 |
| 3,065,268 | 11/1962 | Mathey et al. | 260—561 |

JOSEPH A. NARCAVAGE, Primary Examiner

UNITED STATES PATENT OFFICE
CERTIFICATE OF CORRECTION

Patent No. 3,778,474          Dated December 11, 1973

Inventor(s) August Stocker

It is certified that error appears in the above-identified patent and that said Letters Patent are hereby corrected as shown below:

In the heading of the patent between the U.S. application data and the international class data, insert:

--Claims priority, application Switzerland, May 27, 1960, No. 6066/60--

Signed and sealed this 23rd day of July 1974.

(SEAL)
Attest:

McCOY M. GIBSON, JR.          C. MARSHALL DANN
Attesting Officer              Commissioner of Patents